(12) United States Patent
Jones et al.

(10) Patent No.: US 7,373,406 B2
(45) Date of Patent: May 13, 2008

(54) METHOD AND SYSTEM FOR EFFECTIVELY COMMUNICATING FILE PROPERTIES AND DIRECTORY STRUCTURES IN A DISTRIBUTED FILE SYSTEM

(75) Inventors: Paul David Jones, Renton, WA (US); Christopher Richard Newcombe, Kirkland, WA (US); Richard Donald Ellis, Carnation, WA (US); Derrick Jason Birum, Duvall, WA (US); Mikel Howard Thompson, Shoreline, WA (US)

(73) Assignee: Valve Corporation, Bellevue, WA (US)

( * ) Notice: Subject to any disclaimer, the term of this patent is extended or adjusted under 35 U.S.C. 154(b) by 836 days.

(21) Appl. No.: 10/317,850

(22) Filed: Dec. 11, 2002

(65) Prior Publication Data

US 2003/0177178 A1    Sep. 18, 2003

Related U.S. Application Data

(60) Provisional application No. 60/341,079, filed on Dec. 12, 2001.

(51) Int. Cl.
*G06F 15/173* (2006.01)
(52) U.S. Cl. ............... 709/226; 717/173; 717/175; 717/176; 719/328
(58) Field of Classification Search ............ 709/201, 709/217, 248, 203, 218, 226; 717/173, 176, 717/177, 172, 178, 100, 121, 162, 175; 705/9, 705/27; 719/328
See application file for complete search history.

(56) References Cited

U.S. PATENT DOCUMENTS

| 4,310,720 | A | 1/1982 | Check, Jr. |
|---|---|---|---|
| 4,920,487 | A | 4/1990 | Baffes |
| 4,999,766 | A | 3/1991 | Peters et al. |
| 5,305,389 | A | 4/1994 | Palmer |
| 5,325,526 | A | 6/1994 | Cameron et al. |
| 5,343,526 | A | 8/1994 | Lassers |

(Continued)

OTHER PUBLICATIONS

Microsoft Corporation, Microsoft Windows 2000 Server Operating System, "Windows 2000 Kerberos Authentication," White Paper, 46 pages (1999).

(Continued)

*Primary Examiner*—Dustin Nguyen
(74) *Attorney, Agent, or Firm*—Darby & Darby PC; John W. Branch

(57) ABSTRACT

A method and system for effectively communicating file properties and directory structures within a distributed file system is provided. A manifest that includes properties relating to all of the files used in an application is created. The manifest is distributed to a client before the client has received all of the files or properties associated with an application. The manifest is stored on the client and is used to determine properties and locations of files used within the application. A distributed file system layer is used to receive file and property requests from the application; determine the location of the requested file, or the property using the manifest, and retrieve the property or file using the manifest. A tool may be used to generate the manifest manually or automatically. File system calls within an application may be replaced with calls that use the distributed file system layer. An interpreter may also be used to intercept the file system calls and replace them with calls that use the distributed file system layer.

24 Claims, 10 Drawing Sheets

U.S. PATENT DOCUMENTS

| | | | | |
|---|---|---|---|---|
| 5,349,643 | A | 9/1994 | Cox et al. | |
| 5,495,533 | A | 2/1996 | Linehan et al. | |
| 5,535,276 | A | 7/1996 | Ganesan | |
| 5,606,693 | A | 2/1997 | Nilsen et al. | |
| 5,613,089 | A | 3/1997 | Hornbuckle | |
| 5,619,716 | A | 4/1997 | Nonaka et al. | |
| 5,634,107 | A | 5/1997 | Yumoto et al. | |
| 5,732,275 | A | 3/1998 | Kullick et al. | |
| 5,737,495 | A | 4/1998 | Adams et al. | |
| 5,742,829 | A | 4/1998 | Davis et al. | |
| 5,757,919 | A | 5/1998 | Herbert et al. | |
| 5,764,992 | A | 6/1998 | Kullick et al. | |
| 5,819,082 | A | 10/1998 | Marion | |
| 5,829,001 | A | 10/1998 | Li et al. | |
| 5,835,601 | A | 11/1998 | Shimbo et al. | |
| 5,850,535 | A | 12/1998 | Maystrovsky et al. | |
| 5,862,339 | A | 1/1999 | Bonnaure et al. | |
| 5,915,112 | A | 6/1999 | Boutcher | |
| 5,926,624 | A | 7/1999 | Katz et al. | |
| 5,933,835 | A | 8/1999 | Adams et al. | |
| 5,960,189 | A | 9/1999 | Stupek, Jr. et al. | |
| 5,970,143 | A | 10/1999 | Schneier | |
| 5,982,893 | A | 11/1999 | Hughes | |
| 5,999,740 | A | 12/1999 | Rowley | |
| 6,009,528 | A | 12/1999 | Teraoka | |
| 6,018,717 | A | 1/2000 | Lee et al. | |
| 6,029,175 | A | 2/2000 | Chow et al. | |
| 6,105,074 | A | 8/2000 | Yokote | |
| 6,119,203 | A | 9/2000 | Snyder et al. | |
| 6,122,372 | A | 9/2000 | Hughes | |
| 6,122,657 | A | 9/2000 | Hoffman, Jr. et al. | |
| 6,154,767 | A | 11/2000 | Altschuler et al. | |
| 6,195,622 | B1 | 2/2001 | Altschuler et al. | |
| 6,223,166 | B1 | 4/2001 | Kay | |
| 6,256,773 | B1 | 7/2001 | Bowman-Amuah | |
| 6,269,400 | B1 | 7/2001 | Douglas et al. | |
| 6,292,889 | B1 | 9/2001 | Fitzgerald et al. | |
| 6,314,409 | B2 | 11/2001 | Schneck et al. | |
| 6,317,786 | B1 | 11/2001 | Yamane et al. | |
| 6,332,198 | B1 | 12/2001 | Simons et al. | |
| 6,338,072 | B1 | 1/2002 | Durand et al. | |
| 6,351,775 | B1 | 2/2002 | Yu | |
| 6,366,947 | B1 | 4/2002 | Kavner | |
| 6,381,742 | B2* | 4/2002 | Forbes et al. | 717/176 |
| 6,397,258 | B1 | 5/2002 | Tsuji et al. | |
| 6,430,608 | B1* | 8/2002 | Shaio | 709/217 |
| 6,438,141 | B1 | 8/2002 | Hanko et al. | |
| 6,453,353 | B1 | 9/2002 | Win et al. | |
| 6,466,979 | B1 | 10/2002 | Plouffe, Jr. | |
| 6,473,793 | B1 | 10/2002 | Dillon et al. | |
| 6,487,455 | B1 | 11/2002 | Balasubramanian | |
| 6,505,255 | B1 | 1/2003 | Akatsu et al. | |
| 6,578,054 | B1 | 6/2003 | Hopmann et al. | |
| 6,578,102 | B1 | 6/2003 | Batchelor et al. | |
| 6,584,568 | B1 | 6/2003 | Dircks et al. | |
| 6,611,812 | B2 | 8/2003 | Hurtado et al. | |
| 6,618,810 | B1 | 9/2003 | Dirie | |
| 6,675,382 | B1* | 1/2004 | Foster | 717/177 |
| 6,678,700 | B1 | 1/2004 | Moore et al. | |
| 6,684,396 | B1 | 1/2004 | Brittain et al. | |
| 6,694,450 | B1 | 2/2004 | Kidder et al. | |
| 6,711,593 | B1 | 3/2004 | Gordon et al. | |
| 6,718,549 | B1 | 4/2004 | Narin et al. | |
| 6,721,786 | B1 | 4/2004 | Gordon et al. | |
| 6,735,601 | B1 | 5/2004 | Subrahmanyam | |
| 6,738,970 | B1* | 5/2004 | Kruger et al. | 717/175 |
| 6,748,470 | B2 | 6/2004 | Goldick | |
| 6,751,608 | B1 | 6/2004 | Cohen et al. | |
| 6,752,313 | B1 | 6/2004 | Caviles et al. | |
| 6,754,821 | B1 | 6/2004 | Berson et al. | |
| 6,766,428 | B2 | 7/2004 | Saulsbury et al. | |
| 6,771,290 | B1 | 8/2004 | Hoyle | |
| 6,799,276 | B1 | 9/2004 | Belissent | |
| 6,829,649 | B1 | 12/2004 | Shorey et al. | |
| 6,848,028 | B1 | 1/2005 | Sugumar et al. | |
| 6,862,616 | B1 | 3/2005 | Tompkins | |
| 6,868,539 | B1* | 3/2005 | Travison et al. | 717/100 |
| 6,871,343 | B1* | 3/2005 | Yoshikawa | 717/162 |
| 6,871,345 | B1 | 3/2005 | Crow et al. | |
| 6,880,086 | B2 | 4/2005 | Kidder et al. | |
| 6,883,168 | B1* | 4/2005 | James et al. | 717/178 |
| 6,912,520 | B2 | 6/2005 | Hankin et al. | |
| 6,938,005 | B2* | 8/2005 | Iverson et al. | 705/27 |
| 6,950,523 | B1 | 9/2005 | Brickell et al. | |
| 6,961,341 | B1 | 11/2005 | Krishnan | |
| 6,986,133 | B2* | 1/2006 | O'Brien et al. | 717/173 |
| 6,996,599 | B1* | 2/2006 | Anders et al. | 709/201 |
| 7,000,230 | B1* | 2/2006 | Murray et al. | 717/172 |
| 7,035,943 | B2* | 4/2006 | Yamane et al. | 709/248 |
| 7,131,111 | B2* | 10/2006 | Passanisi | 717/121 |
| 2002/0035526 | A1 | 3/2002 | Kutaragi et al. | |
| 2002/0059408 | A1 | 5/2002 | Pattabhiraman et al. | |
| 2002/0075844 | A1 | 6/2002 | Hagen | |
| 2002/0150253 | A1 | 10/2002 | Brezak et al. | |
| 2002/0166117 | A1 | 11/2002 | Abrams et al. | |
| 2002/0172222 | A1 | 11/2002 | Ullmann et al. | |
| 2003/0009365 | A1* | 1/2003 | Tynan et al. | 705/9 |
| 2003/0039211 | A1 | 2/2003 | Hvostov et al. | |

OTHER PUBLICATIONS

International Preliminary Examining Authority, Written Opinion, dated May 31, 2006, for International Application No. PCT/US02/39975, 6 pages.

International Preliminary Examination Report mailed Oct. 17, 2006 from Application No. PCT/US02/39975.

Rajiv Jauhari et al.; "Priority-Hints: An Algorithm for Priority-Based Buffer Management," Proceedings of the 16th VLDB Conference, Brisbane, Australia, Aug. 1990, pp. 708-721.

* cited by examiner

FIG. 5

| APPLICATION 505 | | | | | |
|---|---|---|---|---|---|
| DISTRIBUTED FILE SYSTEM API 510 | | | | | |
| fread 515 | fopen 520 | ftell 525 | fseek 530 | rewind 535 | fwrite 540 |
| STORAGE SYSTEM 545 | | | | | |

500

METHOD AND SYSTEM FOR EFFECTIVELY COMMUNICATING FILE PROPERTIES AND DIRECTORY STRUCTURES IN A DISTRIBUTED FILE SYSTEM

RELATED APPLICATION

This application is a Utility Patent application based on a previously filed U.S. Provisional Patent application, U.S. Ser. No. 60/341,079 filed on Dec. 12, 2001, the benefit of the filing date of which is hereby claimed under 35 U.S.C. § 119(e).

BACKGROUND

Today, some software applications may be distributed over a network, such as the Internet. Additionally, some software applications may be run over a network using a client and server model. This model, however, may have problems with available bandwidth when the application on the client makes a lot of requests to the server for properties relating to the files used within the application. Each request requires bandwidth that may be needed by some other process or event. The slower the connection the client has, the more burdensome these requests may become. This is, of course, assuming that the server can keep up with all of the requests that are coming in from all of the clients. Server requests across a wide area network can take a significant amount of time due to network delay, traffic, and/or a high number of users connected to the server. Consequently, it may be inefficient to make numerous file property requests to a server. What is needed, therefore, is an efficient way to distribute information relating to files within a distributed file system.

SUMMARY

A method and system is directed at effectively communicating file properties and directory structures within a distributed file system.

According to one aspect of the invention, a manifest is created that includes properties relating to the files used in an application. These properties may be file properties or directory properties.

According to another aspect of the invention, the manifest is distributed to a client before the client has received all of the files associated with an application. The manifest may be downloaded before the client requests any files or properties relating to the application. The manifest is stored on the client and is used to determine properties and locations of files used within the application. In this way, the client may use the local manifest to obtain the properties without having to make a server request.

According to another aspect of the invention, a tool may be used to generate the manifest manually or automatically. For example, after a developer has created an application, the tool may go through each file in the application's directory structure and record information about the files and directories.

According to another aspect of the invention, a distributed file system layer is used to receive file and property requests from the application; determine the location of the requested file, or the property, using the manifest and retrieve the property or file.

According to another aspect of the invention, a distributed file system API is provided. File system calls within an application may be replaced with calls that use the distributed file system layer. Alternatively, the distributed file system API may replace the standard file system I/O API by linking the API with the application. An interpreter may also be used to intercept the file system calls and replace them with calls that use the distributed file system layer.

BRIEF DESCRIPTION OF THE DRAWINGS

FIG. 5 shows exemplary functions that may be found in a distributed file system API;

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. The term "resource" is any data an application uses for execution. For example, a resource may be a particular portion of a file. The file may be a data file, a dynamic link library, an executable program, a component, and the like.

These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

Communicating Properties in a Distributed File System

Figure 6:
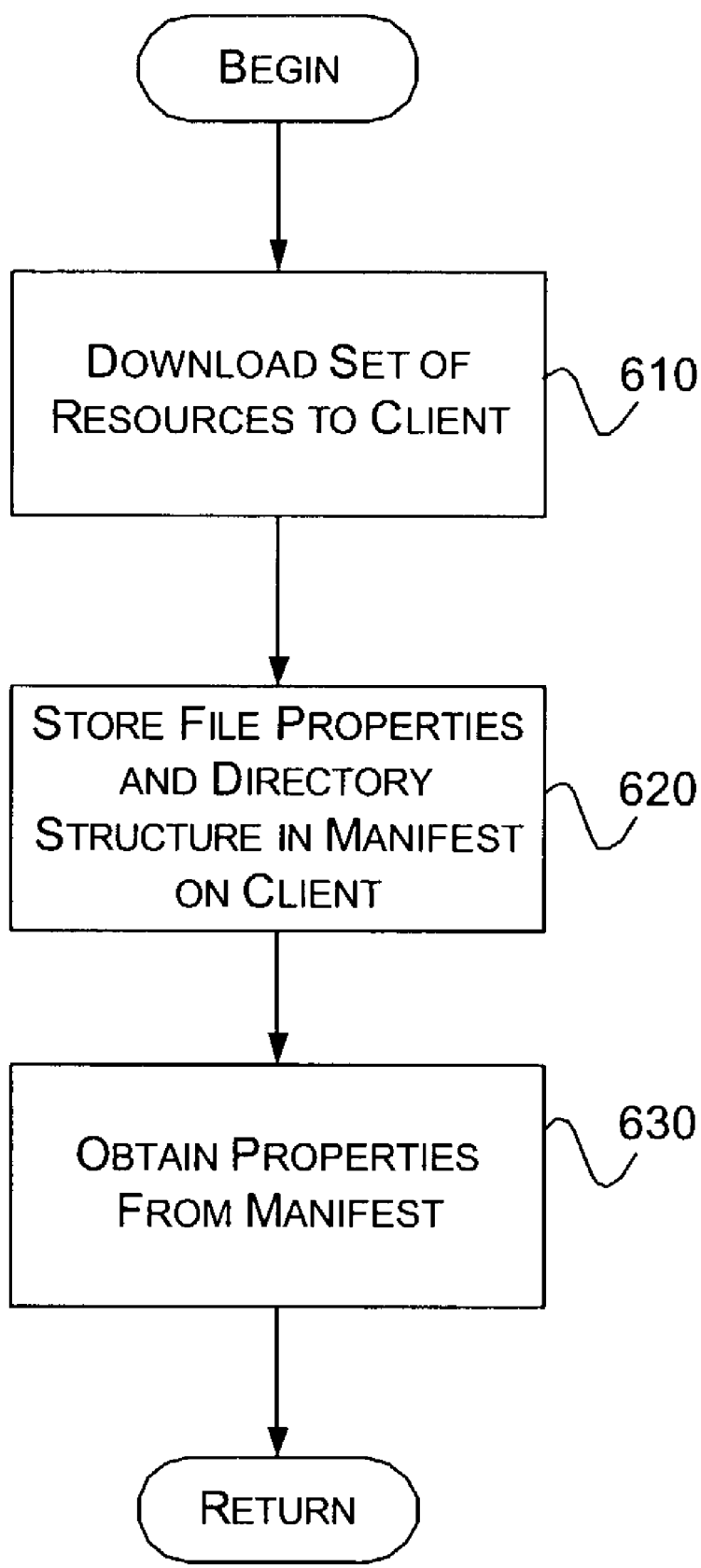
FIG. 6 illustrates a method for effectively communicating file properties and directory structures.
Figure 7:
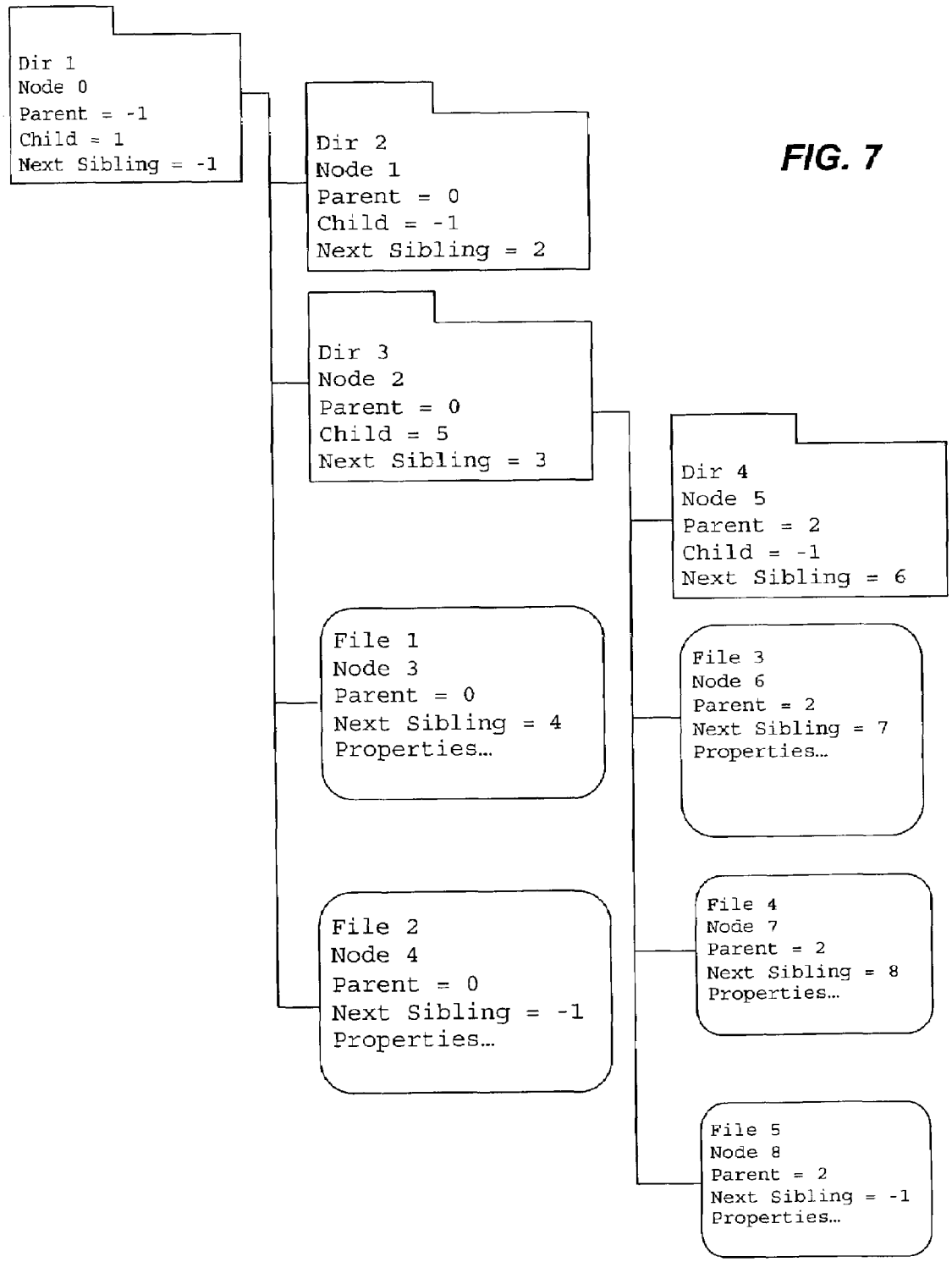
FIG. 7 shows an exemplary linked structure used to store properties and locations of the files in an application.
Figure 8:
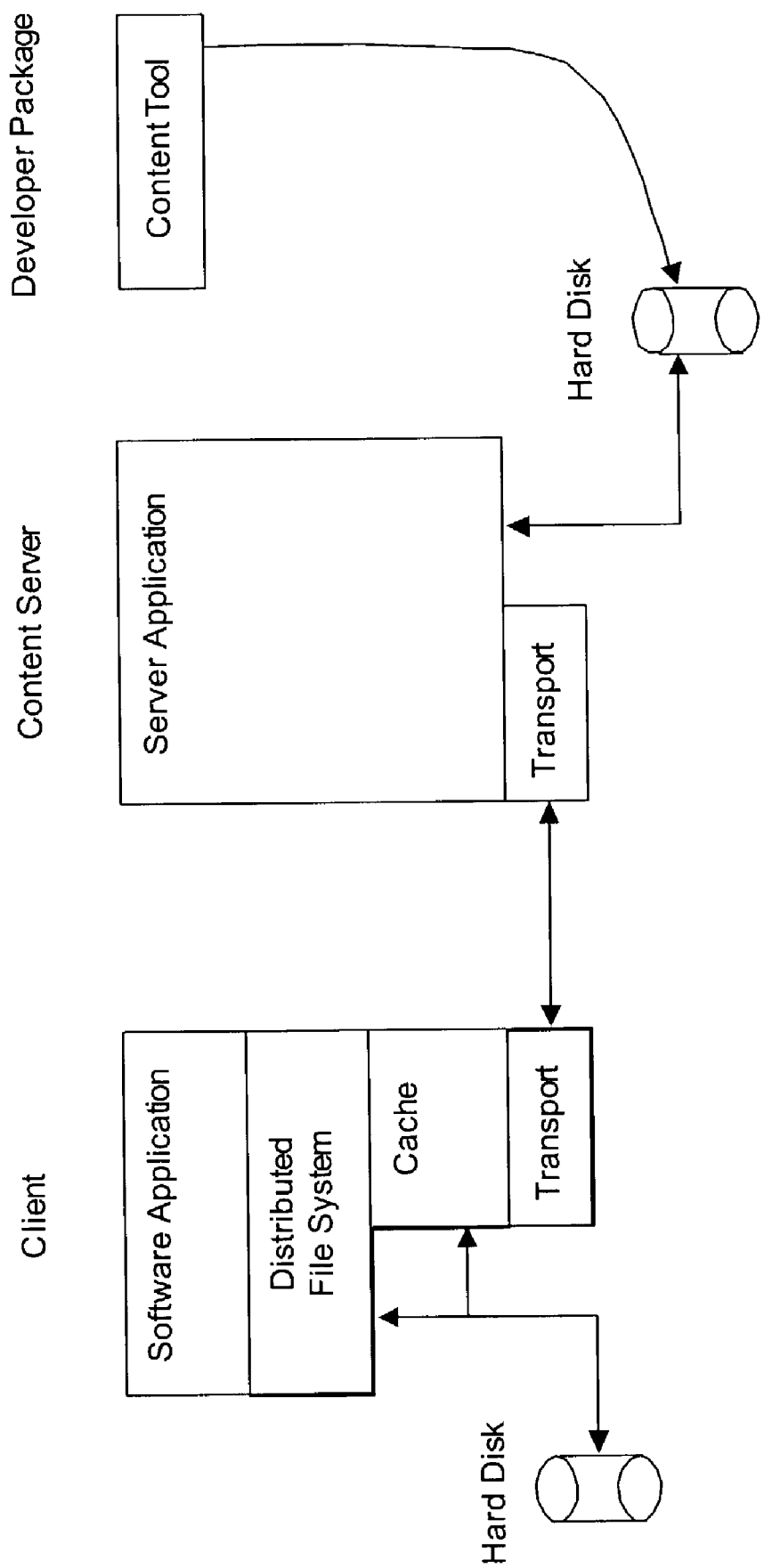
FIG. 8 illustrates a system for communicating file properties and directory structures in a distributed file system.

With regard to FIGS. 6-8, a method and system are disclosed for effectively communicating file properties and directory structures in a distributed file system. In one embodiment of the invention, a minimum set of files or resources are needed to start the application. This minimum set of files may be initially downloaded to a client (block 610). Typically, this set of files is much smaller than the total amount of content that an application may potentially use while executing. As an application executes and needs additional file resources, requests for the resources may be sent to the server. The server may respond by sending the requested resources to the client. When the client receives a resource, the client may store the resource where it is easily accessible by the client, such as on a hard drive. The next time the application requests the resource, the resource may be loaded relatively quickly. Over time as an application executes, it may request a large proportion of all the file resources that make up the application. Consequently, after a period of time, most or all of an application's files may be transferred from a server, such as a content server, to the client.

When only a minimum set of files have been initially downloaded to a client, and the application begins to execute, a large number of files may not be present on the client that the application needs. In previous distributed file systems, each time an application needed to obtain information about a file, for example, its size or properties; it might need to make a server request. Additionally, in previous distributed file systems, each time an application needed to obtain information about what files were located in a particular directory, the application might be required to make a server request. Server requests across a wide area network can take a significant amount of time due to network delay, traffic, and/or a high number of users connected to the server. Consequently, it may be inefficient to make numerous file property requests to a server. An embodiment of the present invention provides a means of storing file properties and directory structure information in a file, called a manifest (block 620). A manifest may be sent to a client with a minimum set of files described above. Instead of making multiple requests to a server, an application may employ a manifest to obtain properties about files or directories (block 620).

A manifest may be created using a software tool. After a developer has created an application, the tool may go through each file in the application's directory structure and record information about the files and directories. This information may include file size, file attributes, directory structure, and/or each file's position within that structure, for example. It will be recognized that any information about files and directory structures could be collected by this tool and recorded in a manifest without departing from the spirit or scope of the invention.

A manifest may be encoded as a binary file, ASCII text, a markup language such as extensible markup language (XML), or any other format without departing from the spirit or scope of the invention. It may include node objects where a node can represent a file or directory type. A file node, for example, may contain information about a file such as file name, size, a reference to a parent directory node, a reference to another file node, such as a next file node in a list, how the file should be treated on the client, for instance if it should be stored as a separate file or in the cache, and/or other attributes. A directory node may contain information about a directory such as attributes, directory name, references to parent and child directory nodes, and a reference to a first file node for the directory. Each node, be it a file or directory, may be assigned a node number. To refer to associated nodes, such as a parent directory node or a next file node, a node may include node number(s) of the referred to node(s). A set of nodes may be used to create a linked structure of information about files and directories of an application. An example of such a linked structure is shown in FIG. 7.

FIG. 8 illustrates a system for communicating file properties and directory structures in a distributed file system. One embodiment of a system capable of performing the functions above includes three components, including a client, a content server, and a developer package. One component resides on the client. As described below, a client may be any type of computer or electronic device capable of executing instructions (See FIG. 3 for an exemplary client). An application executing on the client may interact with a distributed file system layer that may be integrated with the application. The distributed file system can take file requests from the application and determine if the files or resources are stored locally or if they need to be retrieved from a content server. The files and resources may be stored in a datastore, such as a hard disk, in a cache, and the like. If a file is stored locally, it can be retrieved quickly from a storage device local to the client. If the file is not local, it may be requested from a server through the distributed file system transport layer. The distributed file system layer may use a manifest to determine properties of a file. It may also keep track of which files are local and which files need to be requested from a server. After the file has been received by the client, it may be stored locally and then used by the application. Over time, as the application executes and requests more files, most, if not all, of the files associated with the application may be transferred from a content server to the client.

Another component of the system, the server application may reside on the content server. This component may receive requests for content from clients as well as provide access to the content. It may authenticate each client that requests content. If the component determines that a client is authentic, it may then determine if the client has permission to access to the requested content. According to one embodiment, when the client is both authentic and has permission to access the requested content, the component enables a connection to be opened between the client and the requested content through the transport layer.

A third component of the system resides in the developer package, and is a content tool. The content tool may run after a developer has completed an application. It may generate a manifest file that can be stored on a content server for distribution to clients.

Figure 9:
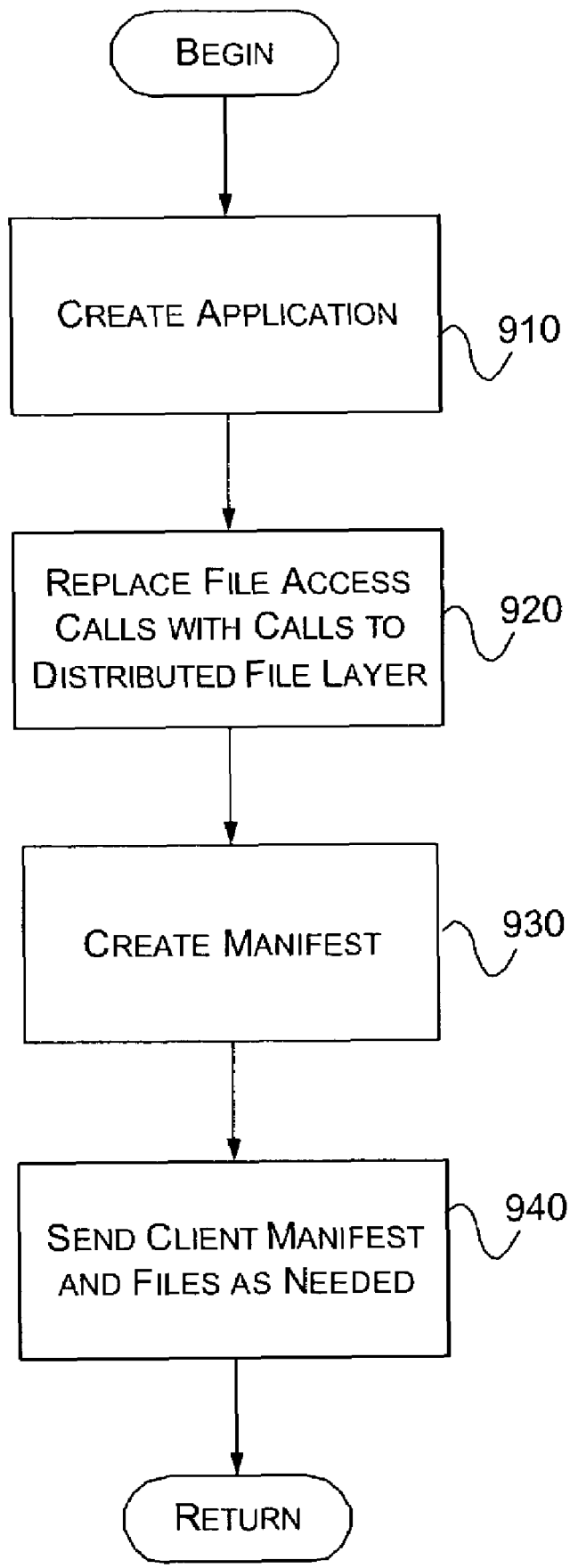
FIG. 9 illustrates a process for creating and using manifests.

FIG. 9 illustrates a process for creating and using manifests. After a start block, the process flows to block 910 where a developer creates an application. A developer may create the application in whatever fashion the developer normally would. During or after creating an application, file access calls in the application may be replaced with calls to routines in a distributed file system software layer (block 920). The file system software layer may be used to insulate the developer and application from the use of manifests and procedures to access distributed files.

After a version of an application is available to release, a content tool may be used to create a manifest and to prepare the files for remote storage on one or more content servers (block 930). After the content tool is finished creating the manifests, the created files may be copied to the content server for distribution to clients. The manifest and files may then be distributed to the client as needed (block 940).

When first accessing an application, a user may first get a launcher program that then may be used to install a set of files needed to get the application running. The launcher program may be obtained by a number of means, for example by downloading it from the Internet or from a storage media, such as a CD-ROM. When the launcher program executes, it may establish a connection with a master server and one or more content servers via a network connection or the Internet. It then may download a minimum footprint of files needed for the application. After a minimum footprint of files has been downloaded, the launcher may start the application automatically and then terminate itself. At that point, the application may establish a connection with a master server and one or more content servers, retrieve a manifest from a content server, and begin requesting file resources as necessary through the distributed file system software layer. The distributed file system software layer may translate all standard file requests from the application and may appear to the application as if all application files are present on the client. This software layer may determine if requested data is resident on a local storage device or if a request to a content server needs to be made. If the data is local, it may be immediately loaded and passed to the application for use. If the data is not local, it may be requested from a content server. Data retrieved from a content server may then be written into either the local cache and/or stored as its own file on the client. As more file resource requests are made by the application, the client gradually stores up most or all of the application resources on its local hard disk.

If the application requests information about a particular file or directory, the distributed file system software layer may respond directly with information from the manifest. To retrieve this information, the request may be parsed into a series of substrings each substring representing an individual directory or file name. For instance, a request for "/Dir1/Dir3/Dir4/File4" may be broken down into four substrings: "Dir1", "Dir3", "Dir4", and "File4". The distributed file system layer may then begin searching a manifest starting with the first node looking for "Dir1". Once that node is found, it may go to the first child node and search for "Dir3" following the node links until the correct node is found. When the "Dir3" node is found, the children of "Dir3" may be searched until "Dir4" is found. The last substring may be a file name so the search may continue until the appropriate file is found. Once the node is found, its contents can be used to provide requested information to the application. Alternatively, or in addition, a hashing function may be employed to access files, wherein a path of a file name may be hashed to quickly find a node number associated with the file name.

Figure 10:
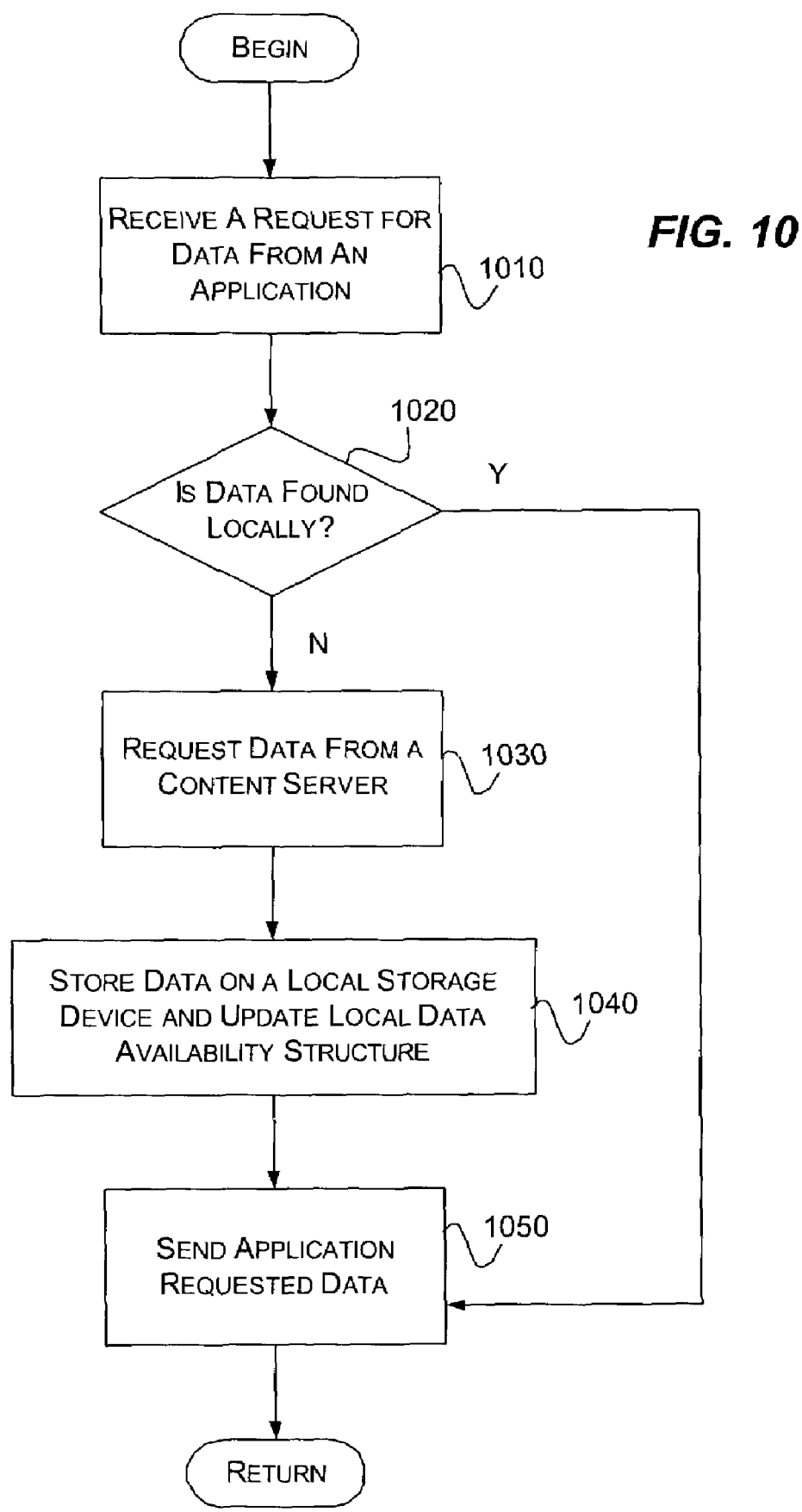
FIG. 10 illustrates a method for transparently accessing a file system that may be distributed locally and over a wide area network.

It will be recognized that a manifest allows a broad range of data about the application to be loaded into a file that can be transferred at one time to a client. The manifest may avoid multiple requests that might be sent to a server to obtain information Transparently Accessing a Distributed File System FIG. 10 illustrates a method for transparently accessing a file system that may be distributed locally and over a wide area network. An embodiment of the invention implements a file system input/output (I/O) API that includes procedures for reading and writing to files in addition to determining properties such as file size, file name, path, etc. (See FIG. 5 and related discussion). The file system may keep track of which files are located locally and which files are not. After a start block, the process flows to block 1010 where the file system API receives a request for a file (or a portion thereof). Flowing to block 1020, the process may determine whether the data requested is located locally. If the data is located locally, the data may be retrieved from a local storage device and sent to the requester (block 1050). If the data is not located locally, the process moves to block 1030. At block 1030, the data is retrieved from a content server. After the data is retrieved from a content server, it may then be stored in a cache file or other file local to a client (block 1040). In addition, a data structure that indicates that the file (or a portion thereof) is locally accessible may also be updated, so that future requests for the file may be obtained by accessing a local storage device (block 1040). The process then transitions to block 1050 where the process sends the application the requested data.

Directory structures and file attributes for an application may be stored locally. This may allow, for example, a request about the size of a file or a request for a list of files contained in a directory to be satisfied without sending a request to another device, such as a content server.

In one embodiment of the invention, a software developer may make changes to source code to cause an application to access the distributed file system I/O API. This may be done manually, through macro substitution, or through some other method for changing calls from a regular file system I/O API to a distributed file system I/O API.

In another embodiment of the invention, changes in source code are not required to access a distributed file system I/O API. Rather, the distributed file system I/O API may be given the same interface as a regular file system I/O API. That is, the distributed file system I/O API may include the same functions as the regular file system I/O API. In addition, each function of the distributed file system I/O API may include the same parameters and return the same values as the regular file system I/O API. Then, the distributed file system I/O API may be linked into an application, thereby replacing the regular file system I/O API. When an application makes a call, the distributed file system I/O API may automatically handle retrieving a file from a distributed file system.

In another embodiment, changes to the source code or linking are not required. The application may be written and developed without any knowledge or planning whatsoever for working on a distributed system. To do this, a distributed file system driver is substituted for, or used in conjunction with, the operating system's file system driver. This driver software is running at a layer in the OS that is below the layer in which the application makes file system calls. Thus to the application, the file system requests look exactly like they normally would. The driver intercepts the file system calls from the application and then determines if the data is resident on the local storage device or needs to be retrieved from the content server. If the data is local, the request is passed on to the operating system's file system layer; otherwise a server request for the data is generated.

Requesting Resources

Figure 4:
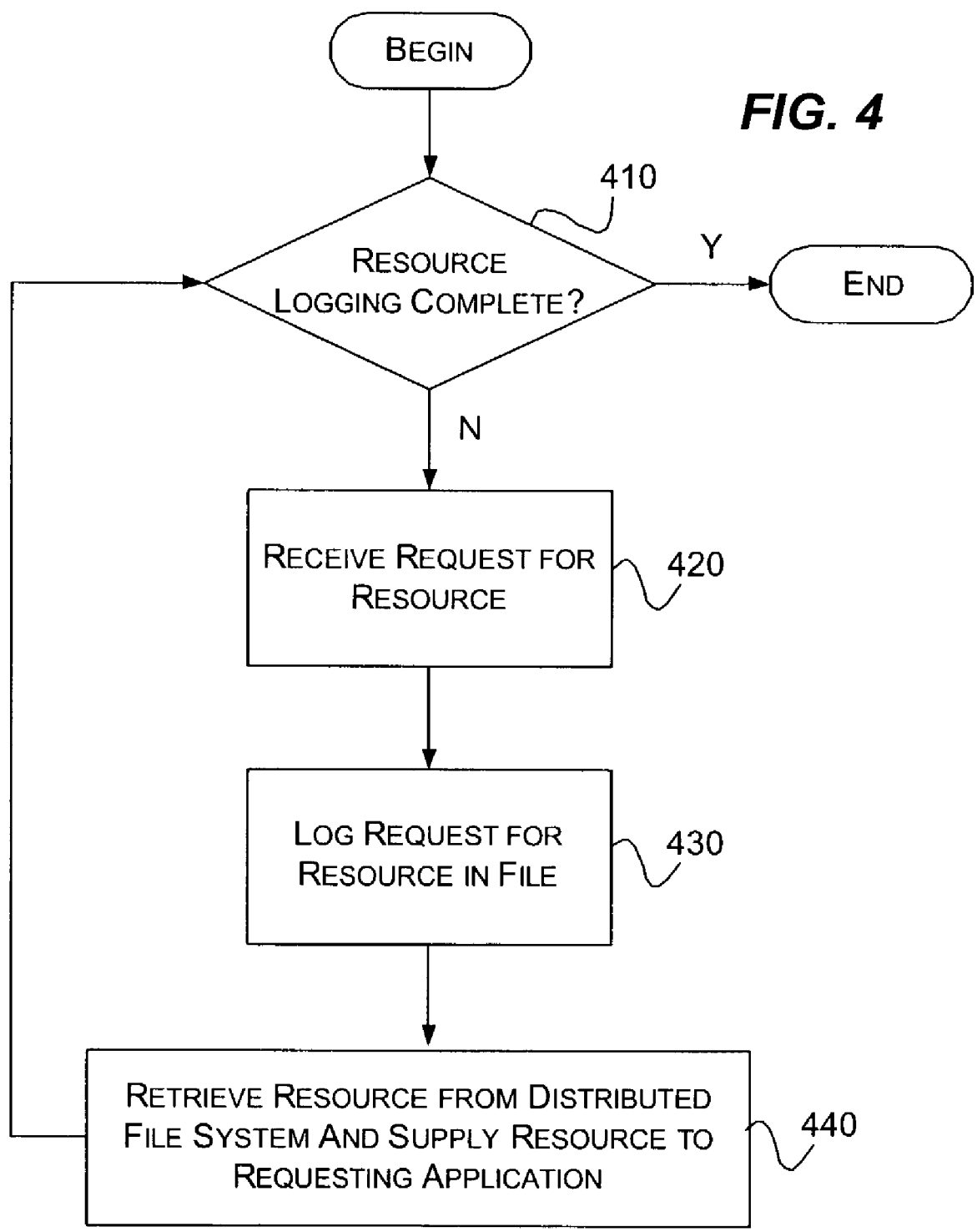
FIG. 4 illustrates a process that may be used to log requests for resources.

With reference to FIGS. 4 and 5, while executing, a program requests resources. In one sense, a resource is anything a program requires or needs to complete execution. For example, a resource includes such things as a particular portion of a file. The file may be a data file, a dynamic link library, an executable program, a component, and the like.

In one embodiment of the invention, a program is instrumented to capture all of a program's requests for resources. This may be done by changing source code or executable code. It may be done automatically or manually. According to one embodiment of the invention, a layer is inserted between an executing program and the operating system that captures each request for a resource by the executing program. After logging the request, the layer passes the request to the operating system to fulfill the request. In another embodiment of the invention, an instrumentation tool examines executable code and locates each of the requests for resources. The tool then inserts code into an executable program that logs each request for a resource. In another embodiment of the invention, a software developer modifies a software program to make calls to specialized functions which log each request for a resource.

In an embodiment of the invention, file access requests are logged. These requests are logged with sufficient detail to determine the specifics of the request. For example, information such as the name of the file requested together with an offset in the file, bytes requested, time of request, length of time to fulfill the request, whether the resource was available in a cache (either in RAM or on a hard drive), and whether the file was found in a local file system or on another machine may be captured for the request.

An example of a process that may be used to log requests for resources is shown in FIG. 4. After a start block the process moves to decision block 410, where a determination is made as to whether resource logging is complete. Resource logging may be considered complete for a variety of reasons. For example, a set number of resource requests may have been logged, a certain amount of time may have elapsed, the number of bytes corresponding to the resources requested may have been reached or exceeded, etc. When resource logging is complete the process moves to an end block and returns to processing other actions. When resource logging is not complete the process moves to block 420 and receives a request for a resource. Moving to block 430 the request for the resource is logged in a file. Flowing to block 440, the resource is retrieved from the distributed file system and is supplied to the requesting application.

An embodiment of the invention replaces an input/output (I/O) library with a new library. For example, the I/O library of the "C" or "C++" language (or any other language) may be replaced or augmented with another library that logs resource requests. In particular, the I/O functions of the "C" language contained in the "C" standard library (stdlib), e.g., fopen, ftell, fseek, fwrite, etc., may be replaced or augmented with functions that log information about the file accesses. In addition Windows specific functions, such as FindFirstFile (a function that returns the first file in a file list), FindNextFile (a function that returns the next file in a file list), and other file access functions may be replaced with calls that also log information about the file accesses. One method for replacing these calls is to link in a new set of libraries having functions with different names, such as ResLogfopen, ResLogftell, ResLogfseek, ResLogFindFirst, ResLogFindNext, etc. Then, macros may be defined in "C" or in other languages using other mechanisms to facilitate changing all calls to fopen, ftell, etc., to corresponding calls such as ResLogfopen, ResLogftell, etc. Then, a software developer wishing to log resource requests may recompile his or her software and link in the replacement libraries.

In another embodiment of the invention, an interpreter is modified or augmented to recognize file system calls. The interpreter may automatically replace such calls with calls to resource logging procedures. Alternatively, or in addition, the interpreter itself may directly log file resource requests. In addition, manual substitution and/or macro substitution, or its equivalent, may be used to automatically replace one set of functions with another set of functions that logs resource requests.

For example, referring to FIG. 5, the new functions may be found in distributed file system API 510. These functions may also utilize standard I/O functions such as fread 515, fopen 520, fte11 525, fseek 530, rewind 535, fwrite 540, and other I/O functions (not shown). For example, when distributed file system API 510 determines that a resource is contained locally, it may make use of one of the f . . . functions contained in stdlib to access the resource. In addition, for a resource that is not found locally, distributed file system API 510 may first retrieve the resource from a content server and then use one or more of the f . . . functions contained in stdlib to access the resource. In addition, functions in distributed file system API 510 may directly access storage system 545 without going through one of the f . . . functions.

Illustrative Operating Environment

Figure 1:
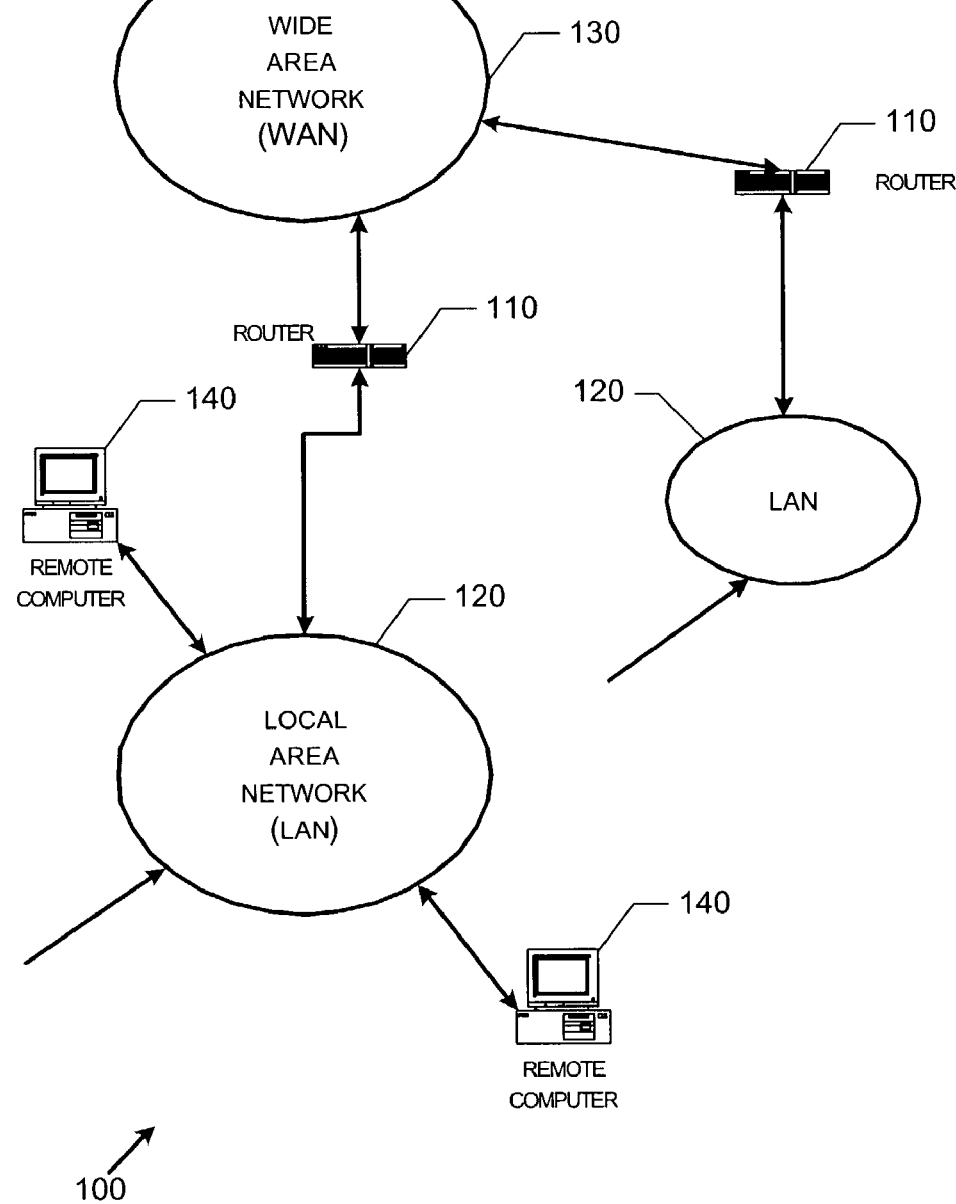
FIGS. 1-3 show components of an exemplary environment in which the invention may be practiced.
Figure 2:
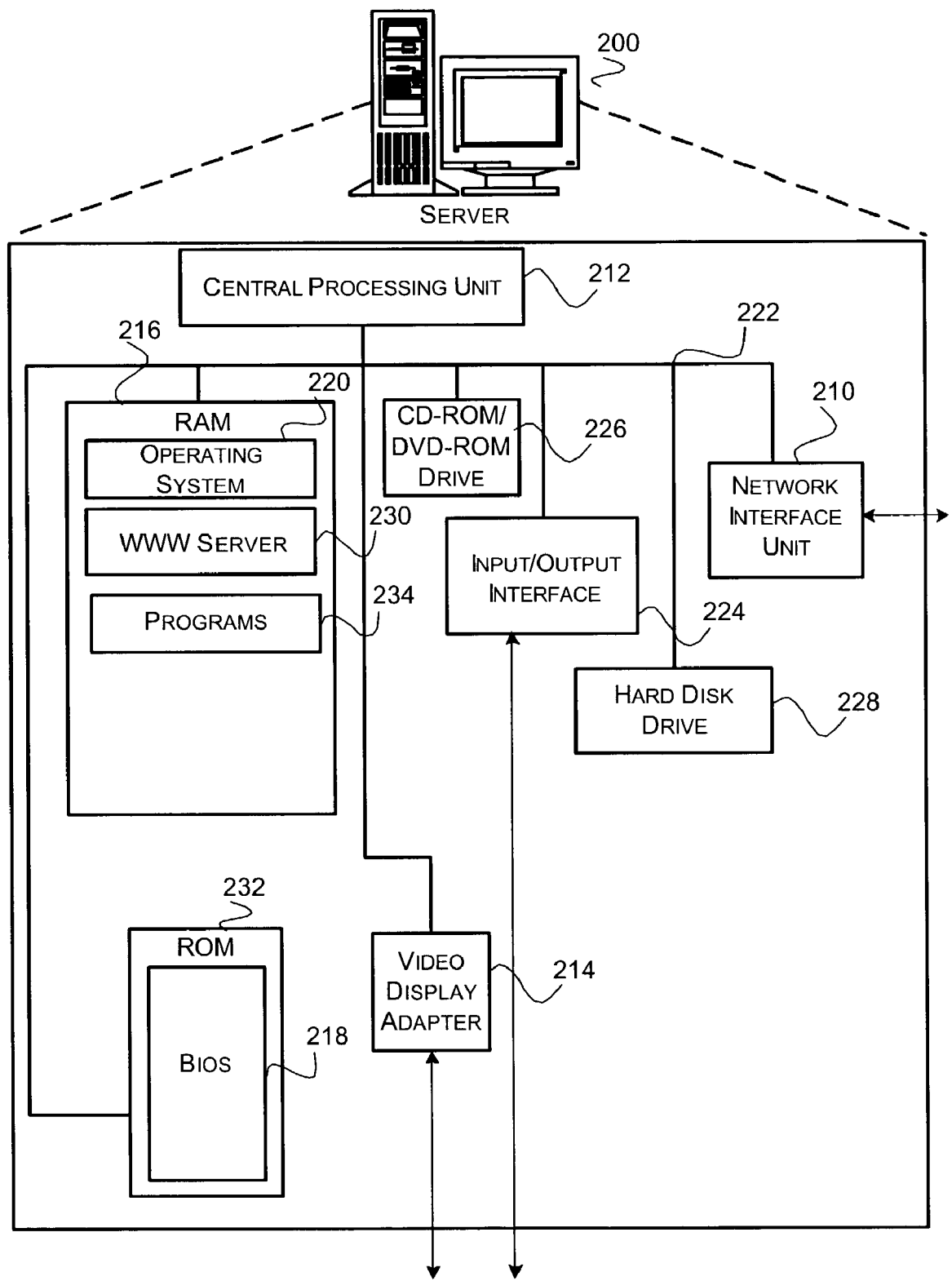
Figure 3:
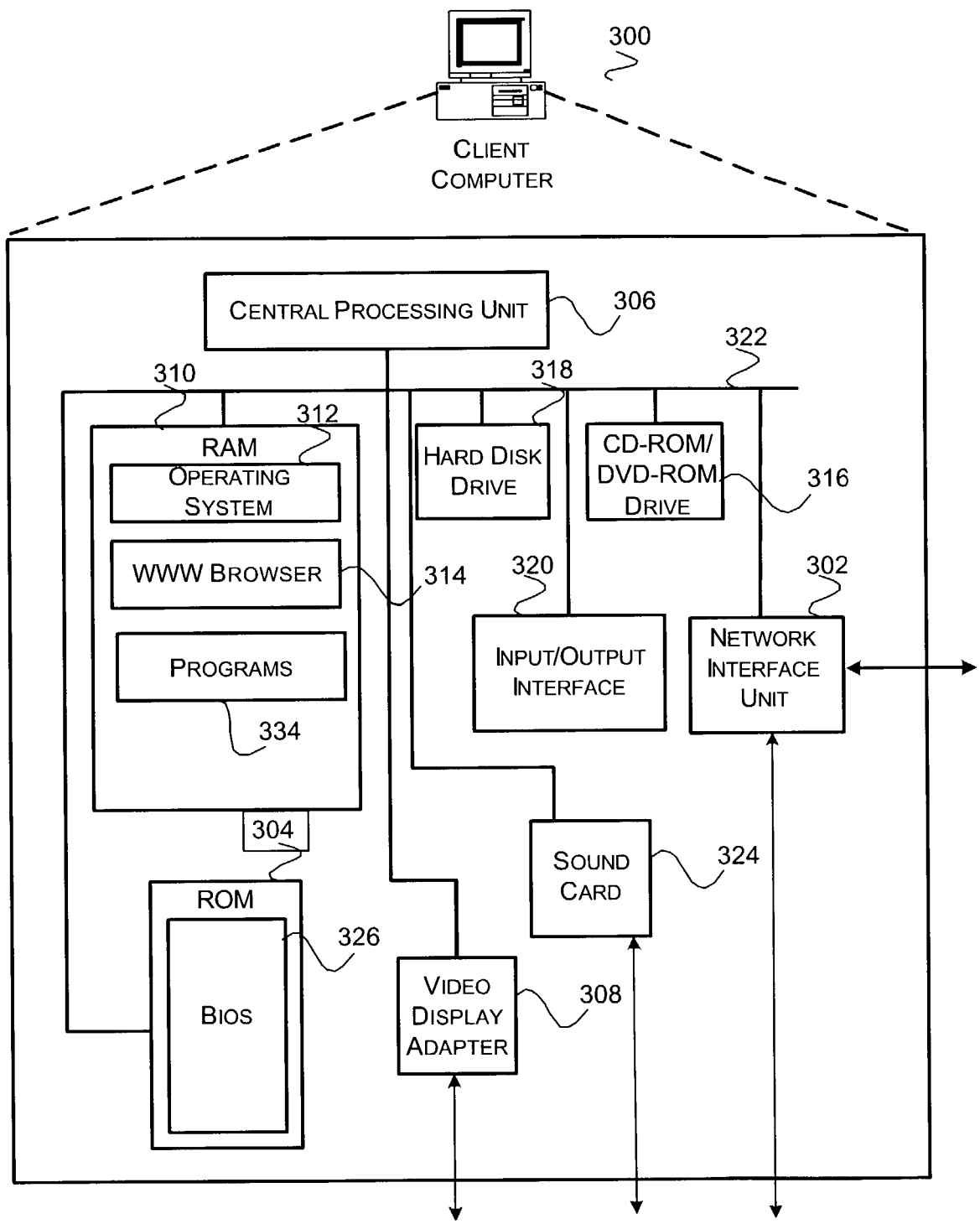

FIGS. 1-3 show components of an exemplary environment in which the invention may be practiced. Not all of the components may be required to practice the invention, and variations in the arrangement and type of the components may be made without departing from the spirit or scope of the invention.

FIG. 1 shows a plurality of local area networks ("LANs") 120 and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known. Furthermore, computers, such as remote computer 140, and other related electronic devices can be remotely connected to either LANs 120 or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational, and other computer systems, that route data and messages. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the World Wide Web (WWW). Generally, the WWW is the total set of interlinked hypertext documents residing on HTTP (hypertext transport protocol) servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via email by using links on the Web page.

A server, such as the server shown in FIG. 2, may provide a WWW site, be a content server, a game server, an authentication server, etc. When providing Web pages, the server may have storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. A WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 2 shows an exemplary server that may operate to provide a WWW site, other content, and/or services, among other things. When providing a WWW site, server 200 transmits WWW pages to the WWW browser application program executing on requesting devices to carry out this process. For instance, server 200 may transmit pages and forms for receiving information about a user, such as address, telephone number, billing information, credit card number, etc. Moreover, server 200 may transmit WWW pages to a requesting device that allow a consumer to participate in a WWW site. The transactions may take place over the Internet, WAN/LAN 100, or some other communications network.

Server 200 may include many more components than those shown in FIG. 2. However, the components shown are sufficient to disclose an illustrative environment for practicing the present invention. As shown in FIG. 2, server 200 is connected to WAN/LAN 100, or other communications network, via network interface unit 210. The network interface unit 210 includes the necessary circuitry for connecting server 200 to WAN/LAN 100, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. It will be appreciated that this component may comprise a general purpose server operating system, such as UNIX, LINUX™, or Microsoft WINDOWS NT®. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site. More specifically, the mass memory may store applications including WWW server application program 230, and programs 234. WWW server application program 230 includes computer executable instructions which, when executed by server 200, generate WWW browser displays, including performing the logic described above. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 also comprises input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by WWW server application program 230. For example, customer databases, product databases, image databases, and relational databases may be stored.

FIG. 3 depicts several components of client computer 300. Client computer 300 may include many more components than those shown in FIG. 3. However, it is not necessary that those conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection.

Client computer 300 also includes BIOS 326, processing unit 306, video display adapter 308, and memory. The memory generally includes RAM 310, ROM 304, and a permanent mass storage device, such as a disk drive. The memory stores operating system 312 and programs 334 for controlling the operation of client computer 300. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on server 200, on client computer 300, or on some combination thereof. For example, programming steps may be contained in programs 334 and/or programs 234.

In this disclosure, references will be made to client and server. Where appropriate, client should be construed to refer to a process or set of processes that execute on one or more electronic device, such as client computer 300 of FIG. 3. A client is not limited, however, to running on a client computer. It may also run on a server, such as WWW server 200 or be distributed among various electronic devices, wherein each device might contain one or more processes or routines that together constitute a client application. Where appropriate, client should be construed, in addition or in lieu of the discussion above, to be a device upon which one or more client processes execute, for example, client computer 300 or WWW server 200.

Similarly, server should be construed to refer to a process or set of processes that execute on one or more electronic devices, such as WWW server 200. Like a client, a server is not limited to running on a server computer. Rather, it may also execute on what would typically be considered a client computer, such as client computer 300 of FIG. 3, or be distributed among various electronic devices, wherein each device might contain one or more processes or routines that together constitute a server application. Where appropriate, server should be construed, in addition or in lieu of the discussion above, to be a device upon which one or more server processes execute, for example, server 200 or client computer 300.

Encryption and Decryption

Throughout this disclosure, references to encryption and decryption are made. Where appropriate, each reference to an algorithm used to perform encryption or decryption should be construed to include any other algorithm or technique for making it more difficult to obtain the original bytes (also called plaintext) of an application, component of an application, and/or data. For each reference to an algorithm used to perform encryption or decryption throughout this disclosure, it should also be recognized that other embodiments of the invention may be implemented using other encryption algorithms, including the proposed Advanced Encryption Standard (AES) which is Rijndael, RSA Labs Inc.'s (hereinafter "RSA's") RC6, IBM's MARS, TwoFish, Serpent, CAST-256, International Data Encryption Algorithm (IDEA), Data Encryption Standard (DES), Triple DES, DES-EDE2, DES-EDE3, DESX, DES-XEX3, RC2, RC5, Blowfish, Diamon2, TEA, SAFER, 3-WAY, GOST, SHARK, CAST-128, Square, Skipjack, Panama, ARC4, SEAL, WAKE, Sapphire II, BlumBlumShub, RSA, DSA, ElGamal, Nyberg-Rueppel (NR), BlumGoldwasser, Rabin, Rabin-Williams (RW), LUC, LUCELG, ECDSA, ECNR, ECIES, ECDHC, ECMQVC, and/or any other encryption algorithm. These encryption algorithms may use, where appropriate, cipher block chaining mode, cipher feedback mode, CBC ciphertext stealing (CTS), CFB, OFB, counter mode, and/or any other block mode. Other exemplary "encryption" techniques that may be used by embodiments of the invention include compiling source code into binary code, and/or using proprietary data structures to send data. In one embodiment of the invention, Crypto++ v4.x, an open-source class library of cryptographic techniques, the source code of which is hereby incorporated by reference, may be used in encrypting or decrypting applications and/or data. Other encryption and decryption libraries, both open source, commercial, and/or proprietary may be used without departing from the spirit or scope of the invention.

In one embodiment of the invention, for symmetric encryption and decryption 128-bit keys and the proposed-AES Rjindael cipher may be used in cipher block chaining mode. Random initialization vectors (IVs) may be sent in plaintext. In another embodiment to protect a password stored on a client, 256-bit Rjindael in cipher feedback mode is used with a random IV. In other embodiments of the invention, other symmetric encryption algorithms (such as the ones listed in the previous paragraph) may be used for symmetric encryption and decryption.

In one embodiment of the invention, for asymmetric encryption, 1024-bit keys may be used with RSA. These keys may be formatted according to the "OAEP (with SHA1)" scheme provided by RSA, or any other formatting appropriate. For example, RSA may be used in conjunction with a ticket (which is described in more detail below) to decrypt data in the ticket to recover an AES key that may then be used to decrypt other portions of a ticket. SHA1 stands for secure hash algorithm 1. SHA1 is a cryptographic hash algorithm that produces a 160-bit hash value from an arbitrary length string. In other embodiments of the invention other private key/public key encryption algorithms may be used (such as the ones listed above) with the same or different key sizes.

In another embodiment of the invention, a server and/or client may also employ a 128-bit HMAC (hashed message authentication code) and/or 1024-bit RSA digital signatures to assist in authenticating that the contents of a ticket have not been changed and/or in authenticating a client and/or server. The 128-bit HMAC may use SHA1 to create a digest of data. For example, contents of a ticket may be fed into a one way hashing function, such as SHA1, to create a block of binary digits. The hashing function may be such that whatever is inputted into it is hashed into fixed length of bits. For example, the hashing function may return 160 bits whether it operates on 4 bytes of data or on all the text in the Bible. A RSA signature may be created and/or formatted as described in RSA's PKCS #1 v2.0, or any other suitable format.

Encryption may be used to protect tickets in a somewhat similar fashion to the Kerberos open protocol from the Massachusetts Institute of Technology (MIT), which is hereby incorporated by reference. Embodiments of the invention that may be used to protect tickets and authenticate clients and/or servers are described below.

Keys may be distributed using 1024-bit RSA and a 128-bit Rjindael symmetric session key. The 1024-bit RSA key may be used to encrypt the 128-bit Rjindael symmetric key. The 128-bit Rjindael key may be used to encrypt the body of a message. To recover a message body, a receiver may use its private RSA key to obtain the 128-bit Rjindael key. Then the 128-bit Rjindael key may be used to decrypt the body of the message. Tickets may include other encrypted 128-bit Rjindael session keys that are sent from one server to another server in a somewhat similar manner to that described in the open Kerberos protocol from MIT.

Encrypted or unencrypted messages or tickets may be sent using TCP/IP, UDP, SSL, IPSEC, or any other networking protocol. Content sent to or from content servers may be encrypted on unencrypted. Random numbers may be generated by any random number generator. An exemplary random number generator that may be used is CryptoAPI, produced by Microsoft Corporation of Redmond, Wash..

It will be recognized that the key sizes given above are illustrative. In other embodiments of the invention, key sizes other than or in addition to the key sizes above may be used when encrypting data and/or authenticating a server, client, or user.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for effectively communicating file properties and directory structures within a distributed file system, comprising:
   creating a manifest that includes properties of files used in an application;
   initially storing the manifest on a server;
   distributing the manifest to a client before the client has received all of the files associated with the application;
   storing the manifest on the client; and
   during execution of the application, performing further actions, including:
   determining when a request for a specific property for a particular file in the application is made by the client;
   retrieving the specific property from the particular file if the particular file is stored on the client;
   retrieving the specific property from the manifest stored on the client if the particular file is unavailable on the client;
   replacing a file call within the application with another call that use a distibution file system layer; and
   the distributed file system layer configured to perform the following actions during execution of the application:
   recieve a file request from the application;
   determine a location of where the request file is stored using the manifest stored in the client memory, wherein the location comprises a local location and a non-local location;
   retrieve the file from the determined location; and
   update the manifest when afile changes locations.

2. The method of claim 1, wherein the properties in the manifest comprise file properties and directory properties.

3. The method of claim 1, wherein creating the manifest further comprises gathering the properties from the files used in the application.

4. The method of claim 2, wherein the properties relating to the file properties comprise at least one of the following properties: a file attribute, a file name, a file size, a file permission; a reference to a parent directory node, a reference to another file node, and an indication on how the file should be treated on the client.

5. The method of claim 2, wherein the properties relating to the directory properties comprise at least one of the following properties: a directory attribute, a directory name, a reference to a parent directory node, a reference to a child directory node, and a reference to a first file node for the directory.

6. The method of claim 4, wherein the indication on how the file should be treated on the client, further comprises an indication of how the file should be stored.

7. The method of claim 2, further comprising creating a linked structure of information about files and directories of an application.

8. The method of claim 7, further comprising using the linked structure to request files associated with the application.

9. The method of claim 2, further comprising logging each request made by the client.

10. The method of claim 9, further comprising determining when logging is complete.

11. The method of claim 10, wherein determining when logging is complete further comprises determining when at least one of the following occurs: a set number of resource requests has been logged, a certain amount of time has elapsed, a number of bytes corresponding to the resources requested has reached a certain predetermined level.

12. A system for effectively communicating file properties and directory structures in a distributed file system, comprising:
a server, comprising:
a network connection configured to communicate with a client;
a memory configured to store files associated with an application;
a process arranged to provide files to the client; and
a process configured to send a manifest to the client before the client receives one of the files associated with the application, wherein the manifest includes properties of files associated with the application; and
a client, comprising:
a network connection configured to communicate with the server;
a memory configured to store files associated with the application;
a memory configured to store the manifest;
an application having associated files, wherein during execution of the application at the client, performing action, including:
determining if a request for a specific property for a particular file in the application is made by the client;
retrieving the specific property from the particular file if the particular file is stored in the client memory; and
retrieving the specific property for a particular file from the manifest stored in the client memory if the particular file is unavailable in the client memory;
replacing a file call within the application with another call that use a distribution file system layer; and
a the distributed file system layer configured to perform the following actions during execution of the application:
receive a file request from the application;
determine a location of where the requested file is stored using the manifest stored in the client memory, wherein the location comprises a local location and a non-local location;
retrieve the file from the determined location; and
update the manifest when a file changes locations.

13. The system of claim 12, further comprising a developer package configured to generate the manifest file.

14. The system of claim 13, wherein the developer package configured to generate the manifest file further comprises a process configured to parse the application and replace file system calls with calls that use a distributed file system API if a file system call is encountered within the application.

15. The system of claim 12, further comprising an interpreter configured to recognize file system calls within the application and replace the calls with calls to the distributed file system layer.

16. The system of claim 12, further comprising an authenticator configured to authenticate the file request.

17. The system of claim 12, wherein the properties in the manifest comprise at least one of the following properties: a file attribute, a file name, a file size, a file permission; a reference to a parent directory node, a reference to another file node, and an indication on how the file should be treated on the client.

18. The system of claim 12, wherein the properties in the manifest comprise at least one of the following properties: a directory attribute, a directory name, a reference to a parent directory node, a reference to a child directory node, and a reference to a first file node for the directory.

19. A system for effectively communicating file properties and directory structures, comprising:
means for creating a manifest that includes properties files used in an application;
means for distributing the manifest to a client;
means for downloading the manifest from a server to a client;
means for storing the manifest locally on the client; and
means for performing further actions, during execution of the application, including:
determining when a request for a specific property for a particular file in the application is made by the client,
retrieving the specific property from the particular file if the particular file is stored on the client; and
retrieving the specific property from the manifest stored on the client if the particular file is unavailable on the client;
replacing a file call within the application with another call that use a distribution file system layer; and
the distributed file system layer configured to perform the following actions during execution of the application:
receive a file request from the application;
determine a location of where the requested file is stored using the manifest stored in the client memory, wherein the location comprises a local location and a non-local location;
retrieve the file from the determined location; and
update the manifest when a file changes locations.

20. A method for effectively communicating file properties and directory structures, comprising:
receiving a request for a file from an application during execution;
determining if the file is local during execution of the application;
retrieving the file from a local storage device, when local, otherwise retrieving the file from a server and storing the retrieved file locally during execution of the application;
updating a data structure indicating that the file is stored locally during execution of the application;
providing the file to the application during execution; and
during execution of the application, if a specific property for a particular file is requested performing further actions, including:
retrieving the specific property from the particular file if the particular file is stored on the local storage device; and
retrieving the specific property from a manifest that is stored at the local storage device if the particular file is unavailable on the local storage device;
replacing a file call within the application with another call that use a distribution file system layer; and
the distributed file system layer configured to perform the following actions during execution of the application:
receive a file request from the application;
determine a location of where the requested file is stored using the manifest stored in the client memory, wherein the location comprises a local location and a non-local location;
retrieve the file from the determined location; and
update the manifest when a file changes locations.

21. The method of claim 20, wherein receiving the request for the file from the application, further comprises accessing a distributed file system I/O API.

22. The method of claim 21, wherein accessing the distributed file system I/O API, further comprises replacing file system calls within an application with call that use the distributed file system I/O API.

23. The method of claim 21, wherein accessing the distributed file system I/O API, further comprises replacing a standard file system I/O API by linking a distributed file system I/O API.

24. The method of claim 21, wherein accessing the distributed file system I/O API, further comprises intercepting standard file system I/O calls and directing the calls to distributed file system I/O API calls.

* * * * *

UNITED STATES PATENT AND TRADEMARK OFFICE
CERTIFICATE OF CORRECTION

| | | |
|---|---|---|
| PATENT NO. | : 7,373,406 B2 | Page 1 of 1 |
| APPLICATION NO. | : 10/317850 | |
| DATED | : May 13, 2008 | |
| INVENTOR(S) | : Jones et al. | |

It is certified that error appears in the above-identified patent and that said Letters Patent is hereby corrected as shown below:

Under item (56) References Cited, on page 2, under "U.S. Patent Documents", in column 2, line 24, below "717/100" delete "6,871,343 B1 3/2005 Yoshikawa 717/162" and insert -- 6,871,344 3/2005 Grier et al. 717/162 --, therefor.

In column 5, line 37, after "information" insert -- . --.

In column 5, line 54, delete "requester" and insert -- requestor --, therefor.

In column 7, line 56, delete "fte11" and insert -- ftell --, therefor.

In column 14, line 21, in Claim 1, delete "distibution" and insert -- distribution, therefor.

In column 14, line 24, in Claim 1, delete "recieve" and insert -- receive --, therefor.

In column 14, line 25, in Claim 1, delete "request" and insert -- requested --, therefor.

In column 14, line 31, in Claim 1, delete "afile" and insert -- a file --, therefor.

In column 15, line 33, in Claim 12, before "the" delete "a".

Signed and Sealed this

Twenty-sixth Day of August, 2008

JON W. DUDAS
*Director of the United States Patent and Trademark Office*